Patented Nov. 12, 1940

2,221,622

UNITED STATES PATENT OFFICE 2,221,622

PURIFICATION OF MANGANESE

Clarence Travis Anderson, Pittsburgh, Pa., assignor to Chicago Development Company, Chicago, Ill., a corporation of Illinois No Drawing. Application January 11, 1939, Serial No. 250,377

4 Claims. (Cl. 75—80)

My invention relates to the purification of electrolytic manganese and is particularly concerned with the removal of sulphur therefrom.

Electrolytic manganese, as made in accordance with the process disclosed in the patent to Shelton, No. 2,119,560 and as prepared in accordance with other processes with which I am familiar, contains from about 0.2% to about 0.3% of sulphur, the remaining impurities being substantially negligible. It has been found that it is highly important, in connection with the preparation of certain alloys, that the sulphur content of electrolytic manganese be considerably reduced, preferably to about 0.02% and in certain instances to about 0.01% or less.

Pure manganese has been prepared heretofore by the distillation of silico-thermic, aluminothermic and electrolytic manganese. Such process is, however, cumbersome, costly and does not lend itself to commercial use.

In accordance with my present invention, sulphur may be effectively removed from electrolytic manganese in a simple, inexpensive and expeditious manner. In general, my novel process comprises melting the electrolytic manganese and agitating it, in its molten condition, with an oxygenated boron compound such as $B_2O_3$, boric acids, and salts, particularly alkali metal salts, of boric acids such as sodium and potassium metaborates and tetraborates. Of particular utility is sodium tetraborate or borax. The sulphur is removed in the form of a gas, namely, sulphur dioxide.

The reaction is not a surface reaction but the oxygenated boron compound appears to disperse or dissolve in the molten manganese and is apparently in equilibrium with the dispersed or dissolved manganese sulphide present in the manganese. As a result, a substantial, though minor, amount of oxygenated boron compound must be added in some cases to obtain effective desulphurization. It should be understood that I do not wish to be limited by what the exact mechanism of the reaction may be since the invention is predicated upon discoveries and results entirely independently of theoretical considerations.

The following examples are illustrative of the practice of my invention. It will be understood that the proportions of materials and the times and temperatures of the reaction may be varied within limits without departing from the spirit of my invention:

Example A 100 pounds of electrolytic manganese, containing 0.22% sulphur, are melted in a high-frequency induction furnace to a temperature between 1300 degrees C. and 1350 degrees C. Due to the low conductivity of the manganese, it is necessary to have the crucible very hot before introducing the manganese. A graphite or other conducting material may be inserted in the crucible to accomplish this result. If difficulty arises in getting the manganese to melt properly, melting may be initiated by means of an oxyhydrogen torch.

To the molten manganese, maintained at the indicated temperature, 10 pounds of borax are added. The stirring which is produced by the high-frequency current is allowed to proceed for twenty minutes. The borax is then removed as completely as possible from the melt. The purified metal, on analysis, shows a content of 0.009% sulphur.

Example B

The procedure described in Example A was repeated employing, however, a temperature of 1450 degrees C. to 1500 degrees C. The manganese metal, after completion of the process, contained 0.022% sulphur.

The melting of the manganese is preferably carried out in a highly dense alumina crucible. Magnesia crucibles may be used, but crucibles containing silica or silicates should be avoided. In general, the melt should not be exposed in any way to contact with silica.

The proportions of borax or other oxygenated boron compound are subject to relatively wide variation. In general, from 5% to 10% by weight of the manganese will be satisfactory in most cases although somewhat more or somewhat less may be utilized with good results.

The temperature at which the manganese and borax or the like are mixed is variable. It should not be so high as to cause undesired volatilization. About 1300 degrees C. to 1500 degrees C. represents a satisfactory working range, the lower temperature being definitely preferable as desulphurization appears to proceed more rapidly and effectively.

What I claim as new and desire to protect by Letters Patent of the United States is:

1. The method of substantially reducing the sulphur content of electrolytic manganese which comprises contacting said electrolytic manganese, in molten condition, with an oxygenated boron compound for a period of time sufficient to effect the desired removal of the sulphur.

2. The method of substantially reducing the sulphur content of electrolytic manganese which comprises agitating said electrolytic manganese, in molten condition, with a salt of boric acid for a period of time sufficient to effect the desired removal of the sulphur.

3. The method of substantially reducing the sulphur content of electrolytic manganese which comprises agitating said electrolytic manganese, in molten condition, with borax for a period of time sufficient to effect the desired removal of the sulphur.

4. In the production and treatment of electrolytic manganese wherein the manganese as produced contains appreciable proportions of sulphur, the steps of removing such sulphur comprising melting the electrolytic manganese and introducing therein an oxygenated boron compound, the oxygenated boron compound being kept in contact with such manganese for a sufficient length of time to effect the desired removal of sulphur.

C. TRAVIS ANDERSON.